US011228911B2

(12) United States Patent
Nam et al.

(10) Patent No.: US 11,228,911 B2
(45) Date of Patent: Jan. 18, 2022

(54) PHYSICAL LAYER SECURITY MANAGEMENT

(71) Applicant: QUALCOMM incorporated, San Diego, CA (US)

(72) Inventors: Wooseok Nam, San Diego, CA (US); Tao Luo, San Diego, CA (US); Soo Bum Lee, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/845,157

(22) Filed: Apr. 10, 2020

(65) Prior Publication Data

US 2020/0344598 A1 Oct. 29, 2020

Related U.S. Application Data

(60) Provisional application No. 62/838,811, filed on Apr. 25, 2019.

(51) Int. Cl.
*H04W 12/30* (2021.01)
*H04W 12/04* (2021.01)
(Continued)

(52) U.S. Cl.
CPC ........... *H04W 12/30* (2021.01); *H04W 12/04* (2013.01); *H04W 12/08* (2013.01); *H04W 72/042* (2013.01)

(58) Field of Classification Search
CPC .. H04W 12/002; H04W 72/042; H04W 12/08
See application file for complete search history.

(56) References Cited

U.S. PATENT DOCUMENTS

2010/0118777 A1* 5/2010 Yamada ............ H04W 74/0833
370/328
2017/0187691 A1* 6/2017 Lee ........................ H04L 9/0822
(Continued)

OTHER PUBLICATIONS

Delaveau F, et al., "Perspectives of Physical Layer Security (Physec) for the Improvement of the Subscriber Privacy and Communication Confidentiality at the Air Interface", Perspectives, Jan. 1, 2016 (Jan. 1, 2016), p. 28, XP55509772, pp. 1-35, Retrieved from the Internet: URL: https://www.ict-prophylaxe.de/wp-content/uploads/2016/02ETSI_WS_prophylaxePhylaws_final_submitted.pdf, [retrieved on Sep. 25, 2018], p. 2-p. 8, p. 14-p. 15, p. 20-p. 22.
(Continued)

*Primary Examiner* — Muthuswamy G Manoharan
(74) *Attorney, Agent, or Firm* — The Marbury Law Group, PLLC

(57) ABSTRACT

Various embodiments include methods, components and wireless devices configured to provide physical layer security in a communication system. In various embodiments, a wireless device processor may receive a first signature from a base station. The wireless device processor may determine a second signature based on the first signature. The wireless device processor may receive from the base station a communication that has been modified using a second signature determined by the base station. The wireless device processor may perform a matching operation to determine whether its second signature matches the second signature used to modify the base station communication. The wireless device processor may enable communications with the base station in response to determining that the second signature determined by its processor matches the second signature used to modify the communication.

33 Claims, 10 Drawing Sheets

(51) Int. Cl.
 *H04W 12/08* (2021.01)
 *H04W 72/04* (2009.01)

(56) References Cited

U.S. PATENT DOCUMENTS

| | | | |
|---|---|---|---|
| 2017/0286410 A1* | 10/2017 | Xu | H04L 5/026 |
| 2017/0289108 A1 | 10/2017 | Lee et al. | |
| 2018/0124602 A1* | 5/2018 | Nair | H04W 12/04 |
| 2018/0124697 A1* | 5/2018 | Nair | H04W 48/20 |
| 2018/0159833 A1* | 6/2018 | Zhang | G06F 21/6245 |
| 2018/0167369 A1 | 6/2018 | Shapira | |
| 2021/0058969 A1* | 2/2021 | Ahn | H04L 1/0061 |

OTHER PUBLICATIONS

International Search Report and Written Opinion—PCT/US2020/027928—ISAEPO—dated Jun. 24, 2020, 15 pages.
Wang X, et al., "Design and Implementation of the NB-IoT Downlink System on Open Air Interface Platform", 2018 IEEE 4th International Conference on Computer and Communications (ICCC), IEEE, Dec. 7, 2018 (Dec. 7, 2018), pp. 880-884, XP033586455, DOI: 10.1109/COMPCOMM.2018.8780852, [retrieved on Jul. 29, 2019] p. 881, left-hand column, line 21—p. 883, left-hand column, line 16, figures 1-3.

\* cited by examiner

PHYSICAL LAYER SECURITY MANAGEMENT

RELATED APPLICATIONS

This application claims the benefit of priority to U.S. Provisional Application No. 62/838,811 entitled "Physical Layer Security Management" filed Apr. 25, 2019, the entire contents of which are hereby incorporated by reference for all purposes.

BACKGROUND

Wireless communication systems are widely deployed to provide a variety of communication and information services. Communication security is important in wireless communication systems. Typical radio access technologies can be configured to provide security functionality such as ciphering and integrity protection, which may be applied to both a control plane (e.g., Radio Resource Control signaling through a Signaling Radio Bearer) and a user plane (e.g., a Data Radio Bearer) data in a Packet Data Convergence Protocol layer. Various radio access technologies may also provide access control through authentication (e.g., via Access Security Management Entity keys or another suitable system).

However, some scheduled downlink communications, such as Medium Access Control (MAC) Control Element (MAC CE) signaling, System Information Block (SIB) messages, and paging information, are not protected by security functions. With these types of transmissions, malicious intruders or jammers may hinder or hijack the unprotected transmission by fabricating a signal with the same format, as a Physical Downlink Control Channel (PDCCH) or Physical Downlink Shared Channel (PDSCH). An intended receiving wireless device may be unable to distinguish between a true and a fabricated transmission.

SUMMARY

Various aspects include methods of managing physical layer security for communications between a wireless device and a base station. Various aspects include methods of protecting downlink communication from the base station to the wireless device.

In some aspects, managing physical layer security, may include receiving, by a processor of a wireless device, a first signature from a base station, determining, by the processor, a second signature based on the first signature, receiving, by the processor, a communication that was modified using the second signature from the base station, performing, by the processor, a matching operation to determine whether the second signature determined by the processor matches the second signature used to modify the communication, and enabling, by the processor, communication with the base station in response to determining that the second signature determined by the processor matches the second signature used to modify the communication.

In some aspects, receiving the first signature from the base station may include receiving, by the processor, a downlink control signal comprising the first signature. In some aspects, receiving the communication that was modified using the second signature from the base station may include receiving, by the processor, a downlink data communication comprising the second signature from the base station. In some aspects, the communication that was modified using the second signature may include a data communication and the second signature.

In some aspects, the communication that was modified using the second signature may include a data communication that has been scrambled using the second signature. In some aspects, performing the matching operation to determine whether the second signature determined by the processor matches the second signature used to modify the communication may include determining, by the processor, whether the second signature determined by the processor matches a second signature received in the communication.

In some aspects, performing the matching operation to determine whether the second signature determined by the processor matches the second signature used to modify the communication may include determining, by the processor, whether the communication can be unscrambled using the second signature determined by the processor. In some aspects, determining the second signature based on the first signature may include determining, by the processor, the second signature based on a function (e.g., an authentication function, a one-way function, a key derivation function, a secure hash function, etc.) applied to the first signature.

In some aspects, determining the second signature based on the first signature may include determining, by the processor, the second signature based on the first signature and a third signature. In some aspects, the third signature may include an access security key. In some aspects, the security key may be obtained or derived based on a key shared between the wireless device and the base station during a security establishment procedure, such as an AS (access stratum) security mode command procedure. In some embodiments, the key shared between the wireless device and the base station during a security establishment procedure may be or include a cryptographic key.

Further aspects may include a wireless device having a processor configured to perform one or more operations of the methods summarized above. Further aspects may include a non-transitory processor-readable storage medium having stored thereon processor-executable instructions configured to cause a processor of a wireless device to perform operations of the methods summarized above. Further aspects include a wireless device having means for performing functions of the methods summarized above. Further aspects include a system on chip for use in a wireless device that includes a processor configured to perform one or more operations of the methods summarized above. Further aspects include a system in a package that includes two systems on chip for use in a wireless device that includes a processor configured to perform one or more operations of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
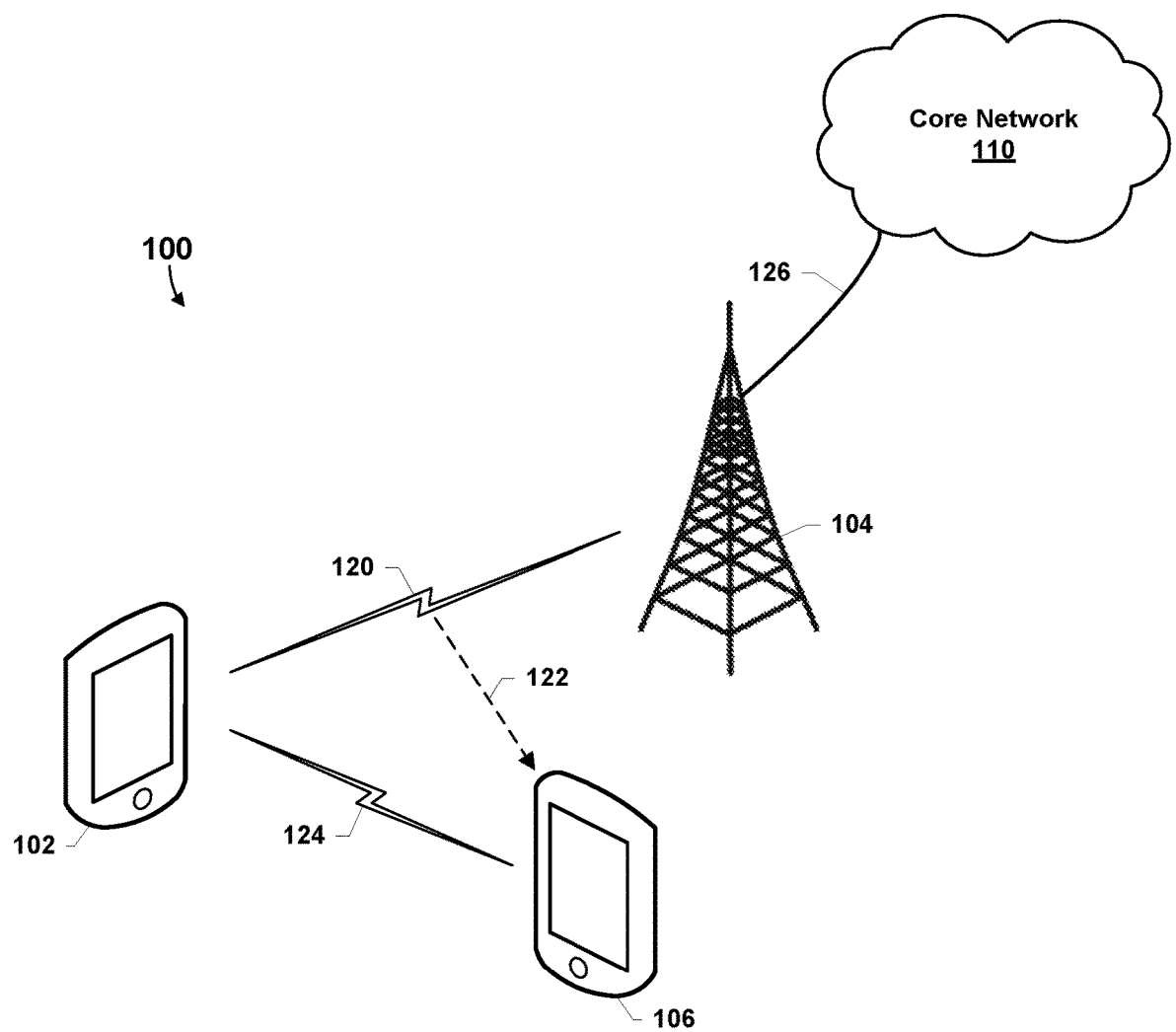
FIG. 1 is a system block diagram conceptually illustrating an example communications system including a small cell and a problem that can develop in such systems.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The term "wireless device" is used herein to refer to any one or all of wireless router devices, wireless appliances, cellular telephones, smartphones, portable computing devices, personal or mobile multi-media players, laptop computers, tablet computers, smartbooks, palmtop computers, wireless electronic mail receivers, multimedia Internet-enabled cellular telephones, wireless gaming controllers, wireless-network enabled Internet of Things (IoT) devices including large and small machinery and appliances for home or enterprise use, wireless communication elements within autonomous and semiautonomous vehicles, wireless devices affixed to or incorporated into various mobile platforms, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single wireless device. The proximity of the SOCs facilitates high speed communications and the sharing of memory and resources.

The term "multicore processor" may be used herein to refer to a single integrated circuit (IC) chip or chip package that contains two or more independent processing cores (e.g., CPU core, Internet protocol (IP) core, graphics processor unit (GPU) core, etc.) configured to read and execute program instructions. A SOC may include multiple multicore processors, and each processor in an SOC may be referred to as a core. The term "multiprocessor" may be used herein to refer to a system or device that includes two or more processing units configured to read and execute program instructions.

The terms "downlink data signal" and "data signal" refer to signaling that includes content data for use in providing a service or function, such as voice communication, messaging, Internet access, media streaming, or another suitable service or function.

The terms "downlink control signal" and "control signal" refer to signaling related to operations or operational parameters of a base station or a wireless device that are not directly related to providing a service or function, for example, downlink scheduling assignments and uplink scheduling grants.

Wireless communication systems may use a variety of radio access technologies (RATs), such as Global System for Mobility (GSM), Universal Mobile Telecommunication Service (UMTS), Long Term Evolution (LTE), and New Radio (NR). Typically, RATs can be configured to provide security functionality such as ciphering and integrity protection, which may be applied to both a control plane (e.g., Radio Resource Control signaling through a Signaling Radio Bearer) and a user plane (e.g., a Data Radio Bearer) data in a Packet Data Convergence Protocol layer. Various radio access technologies may also provide access control through authentication (e.g., via Access Security Management Entity keys or another suitable system).

However, some scheduled communications are not typically protected, such as MAC signaling (MAC CE), broadcast information (e.g., SIB signals), and paging information, and downlink communication channels such as the PDCCH and PDSCH. MAC signaling (MAC CE), broadcast information (e.g., SIB signals), and paging information, are typically not protected by security functionalities, because speed of communication is judged more important than security for these signals. However, the signals provided in the PDCCH and PDSCH may be include control information and content data (e.g., voice, content for user services, etc.), and thus security may be more important for these signals. Malicious intruders or jammers may hinder or hijack the unprotected signals by fabricating a transmission with the same format (e.g., an appropriate PDCCH or PDSCH format). Without security protection, a wireless device intended to receive the PDCCH or PDSCH signals may be unable to distinguish between true and fabricated transmissions.

Various embodiments include wireless devices configured to perform methods of managing physical layer security in wireless communications. Various embodiments enable wireless devices to determine whether a transmission genuinely originates from a purported transmitting device or whether the transmission is a fake or fabricated message from a malicious device. In some embodiments, a base station and a wireless device may use signatures, such as a specified waveform or a specified bit or data sequence, to provide integrity protection as well as communication privacy for signals transmitted from the base station to the wireless device. In some embodiments, the wireless device may use at least a transmitted signature and a locally-determined signature to distinguish between true and fabricated signals.

In some embodiments, a wireless device and a base station may establish a communication link. For example, a wireless device and a base station may negotiate a communication link and enter an RRC_Connected mode or a similar state or operational mode. Communications between the wireless device and the base station over the communication link may include downlink control signals and downlink data signals sent by the base station to the wireless device. For example, the base station may send downlink control signals to the wireless device via a PDCCH, and may send downlink data signals to the wireless device via a PDSCH. It should be noted that operation in the RRC_Connected mode or similar mode of operation is not required. For example, the transmission and reception of SIB signaling and paging signaling does not required either the wireless device or the base station to operation in RRC_Connected mode or a similar mode. Some operations and signaling, however, such as MAC-CE require operation in the RRC_Connected mode or similar mode.

In some embodiments, the base station may determine or generate a first signature. In some embodiments, the base station may send the first signature to the wireless device via the PDCCH. In some embodiments, the first signature may include a specific sequence of bits. In some embodiments, the specific sequence of bits may be a random number. In some embodiments, the specific sequence of bits may be a value that is incremented after performing an operation, e.g., a counter. For example, a counter may be incremented after sending a message over the PDCCH for a specific wireless device, to generate a new counter value for each PDCCH message. The first signature may be appended to a control signal sent by the base station to the wireless device via the PDCCH. In some embodiments, the first signature may be appended to the control payload before or after a cyclic redundancy check (CRC), or before or after channel coding. In some embodiments, the first signature may include a specific waveform. The specific waveform, for example a preamble, may be transmitted in or along with control signaling via the PDCCH. In some embodiments, the first signature may include a PDCCH demodulation reference signal (DMRS) sequence. The PDCCH DMRS may be generated from a function with inputs such as a cell ID (e.g., CELLID), an initialization seed, a system frame number, etc. In some embodiments, the initialization seed could itself be a function of the first signature. In some embodiments, the base station may determine the DMRS sequence from a function with inputs such as a cell identifier (cell ID), an initialization seed, a system frame number, and/or other functional or operational parameters of the base station. In some embodiments, the initialization seed can be a function of the first signature. In some embodiments, the first signature may include any combination of the foregoing.

In some embodiments, the base station may determine a second signature based on the first signature. In some embodiments, the wireless device may independently determine a second signature based on the first signature.

In some embodiments, the base station may modify a communication using its second signature. In some embodiments, the base station may modify a data signal using the second signature. In some embodiments, the base station may append the second signal to a portion of the data signal. In some embodiments, the base station may scramble one or more portions of the data signal using the second signature.

In some embodiments, the base station may send the modified communication to the wireless device via the PDSCH.

In some embodiments, the wireless device may receive the modified communication, such as via the PDSCH. In some embodiments, the wireless device may perform a matching operation to determine whether the second signature determined by the wireless device matches the second signature used by the base station to modify the communication. In some embodiments, the wireless device may identify the second signature in the modified communication sent by the base station, and the wireless device may perform the matching operation on the received second signature and the second signature determined by the wireless device. In some embodiments, the wireless device may use its determined second signature to descramble one or more portions of the data signal.

In some embodiments, in response to determining that the second signature determined by the wireless device does not match the second signature used to modify the communication, the wireless device may determine that the received communications are false or spurious. In some embodiments, the wireless device may determine that the control signals are false or spurious. In some embodiments, the wireless device may determine that the data signals are false or spurious. In some embodiments, the wireless device may block or not permit further communication with the other device.

In some embodiments, in response to determining that the second signature determined by the wireless device matches the second signature used to modify the communication, the wireless device may determine that the received communications (i.e., control signals and/or data signals) are genuine. In some embodiments, the wireless device may enable communication with the base station.

In various embodiments, the base station may dynamically change the signatures to provide greater integrity protection and privacy for the communications. In some embodiments, from time to time the base station may generate a new first signature. The base station may send the new first signature to the wireless device via the downlink control channel. The base station or the wireless device may then perform the operations described above using the new signature.

FIG. 1 illustrates an example communications system 100 in which various embodiments may be performed. The communications system 100 may include a heterogeneous network architecture that includes a core network 110 and a variety of base stations that support wireless communications, such as base station 104. The communications system 100 may include wireless devices such as wireless device 102. The communications system 100 may also include a malicious wireless device 106.

The base station 104 may communicate with the core network 110 over a wired or wireless communication link 126. The wireless device 102 may communicate with the base station 104 over a wireless communication link 120. The malicious wireless device 106 may receive or intercept 122 communications between the base station 104 and the wireless device 102. The malicious wireless device 106 may also communicate with the wireless device 102 via a wireless communication link 124.

The wired communication link 126 may use a variety of wired networks (e.g., Ethernet, TV cable, telephony, fiber optic and other forms of physical network connections) that may use one or more wired communication protocols, such as Ethernet, Point-To-Point protocol, High-Level Data Link Control (HDLC), Advanced Data Communication Control Protocol (ADCCP), and Transmission Control Protocol/ Internet Protocol (TCP/IP). The wireless communication links 120 and 124 may include a plurality of carrier signals, frequencies, or frequency bands, each of which may include a plurality of logical channels. The wireless communication links 120 and 124 may utilize one or more RATs. Examples of RATs that may be used in a wireless communication link include 3GPP LTE, 3G, 4G, 5G (e.g., NR), GSM, Code Division Multiple Access (CDMA), Wideband Code Division Multiple Access (WCDMA), Worldwide Interoperability for Microwave Access (WiMAX), Time Division Multiple Access (TDMA), and other mobile telephony communication technologies cellular RATs. Further examples of RATs that may be used in one or more of the various wireless communication links within the communication system 100 include medium range protocols such as Wi-Fi, LTE-U, LTE-Direct, LAA, MuLTEfire, and relatively short range RATs such as ZigBee, Bluetooth, and Bluetooth Low Energy (LE).

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block") may be 12 subcarriers (or 180 kHz). Consequently, the nominal Fast File Transfer (FFT) size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While descriptions of some embodiments may use terminology and examples associated with LTE technologies, various embodiments may be applicable to other wireless communications systems, such as new radio (NR) or 5G network. NR may utilize OFDM with a cyclic prefix (CP) on the uplink (UL) and downlink (DL) and include support for half-duplex operation using time division duplex (TDD). A single component carrier bandwidth of 100 MHz may be supported. NR resource blocks may span 12 sub-carriers with a sub-carrier bandwidth of 75 kHz over a 0.1 ms duration. Each radio frame may consist of 50 subframes with a length of 10 ms. Consequently, each subframe may have a length of 0.2 ms. Each subframe may indicate a link direction (i.e., DL or UL) for data transmission and the link direction for each subframe may be dynamically switched. Each subframe may include DL/UL data as well as DL/UL control data. Beamforming may be supported and beam direction may be dynamically configured. Multiple Input Multiple Output (MIMO) transmissions with precoding may also be supported. MIMO configurations in the DL may support up to 8 transmit antennas with multi-layer DL transmissions up to 8 streams and up to 2 streams per wireless device. Multi-layer transmissions with up to 2 streams per wireless device may be supported. Aggregation of multiple cells may be supported with up to 8 serving cells. Alternatively, NR may support a different air interface, other than an OFDM-based air interface.

Downlink transmissions from the base station 104 to the wireless device 102, such as downlink control signaling and downlink data signaling, may be unprotected by security functions. Further, the wireless device 102 may be unable to distinguish between true downlink signals (i.e., from the base station 104) or fabricated downlink signals (i.e., from the malicious wireless device 106).

Various embodiments provide protection for physical layer signaling, such as downlink signaling in the PDCCH and/or PDSCH. Various embodiments enable the wireless device 102 to determine whether signals received via downlink channels are true transmissions (i.e., from the base station 104) or are fabricated transmissions (i.e., from the malicious wireless device 106).

Figure 2:
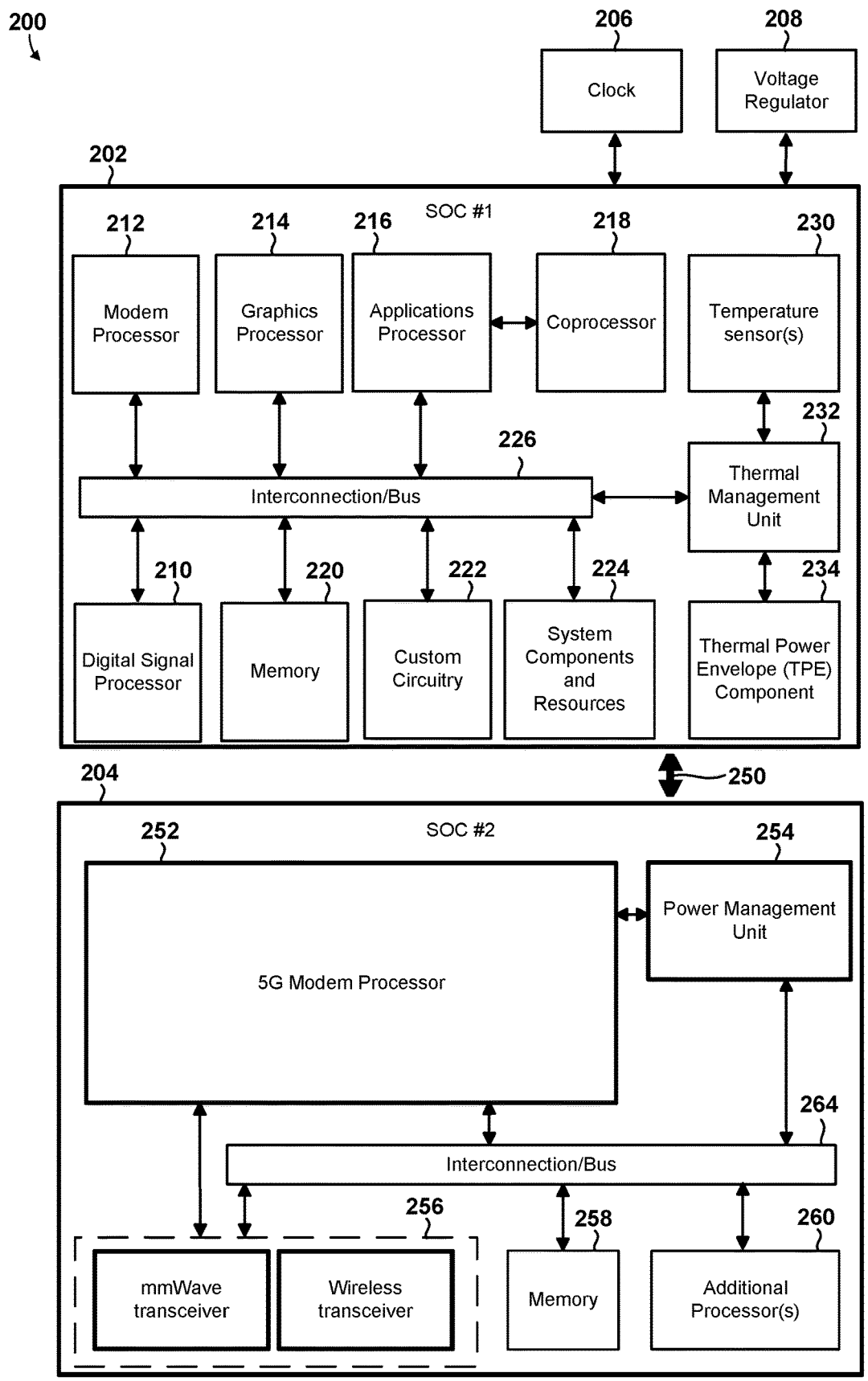
FIG. 2 is a component block diagram illustrating a computing system that may be configured to implement management of cell selection in accordance with various embodiments.

Various embodiments may be implemented on a number of single processor and multiprocessor computer systems, including a system-on-chip (SOC) or system in a package (SIP). FIG. 2 illustrates an example computing system or SIP 200 architecture that may be used in wireless devices implementing the various embodiments.

With reference to FIGS. 1 and 2, the illustrated example SIP 200 includes a two SOCs 202, 204, a clock 206, and a voltage regulator 208. In some embodiments, the first SOC 202 operate as central processing unit (CPU) of the wireless device that carries out the instructions of software application programs by performing the arithmetic, logical, control and input/output (I/O) operations specified by the instructions. In some embodiments, the second SOC 204 may operate as a specialized processing unit. For example, the second SOC 204 may operate as a specialized 5G processing unit responsible for managing high volume, high speed (e.g., 5 Gbps, etc.), and/or very high frequency short wave length (e.g., 28 GHz mmWave spectrum, etc.) communications.

The first SOC 202 may include a digital signal processor (DSP) 210, a modem processor 212, a graphics processor 214, an application processor 216, one or more coprocessors 218 (e.g., vector co-processor) connected to one or more of the processors, memory 220, custom circuitry 222, system components and resources 224, an interconnection/bus module 226, one or more temperature sensors 230, a thermal management unit 232, and a thermal power envelope (TPE) component 234. The second SOC 204 may include a 5G modem processor 252, a power management unit 254, an interconnection/bus module 264, a plurality of mmWave transceivers 256, memory 258, and various additional processors 260, such as an applications processor, packet processor, etc.

Each processor 210, 212, 214, 216, 218, 252, 260 may include one or more cores, and each processor/core may perform operations independent of the other processors/cores. For example, the first SOC 202 may include a processor that executes a first type of operating system (e.g., FreeBSD, LINUX, OS X, etc.) and a processor that executes a second type of operating system (e.g., MICROSOFT WINDOWS 10). In addition, any or all of the processors 210, 212, 214, 216, 218, 252, 260 may be included as part of a processor cluster architecture (e.g., a synchronous processor cluster architecture, an asynchronous or heterogeneous processor cluster architecture, etc.).

The first and second SOC 202, 204 may include various system components, resources and custom circuitry for managing sensor data, analog-to-digital conversions, wireless data transmissions, and for performing other specialized operations, such as decoding data packets and processing encoded audio and video signals for rendering in a web browser. For example, the system components and resources 224 of the first SOC 202 may include power amplifiers, voltage regulators, oscillators, phase-locked loops, peripheral bridges, data controllers, memory controllers, system controllers, access ports, timers, and other similar components used to support the processors and software clients running on a wireless device. The system components and resources 224 and/or custom circuitry 222 may also include circuitry to interface with peripheral devices, such as cameras, electronic displays, wireless communication devices, external memory chips, etc.

The first and second SOC 202, 204 may communicate via interconnection/bus module 250. The various processors 210, 212, 214, 216, 218, may be interconnected to one or more memory elements 220, system components and resources 224, and custom circuitry 222, and a thermal management unit 232 via an interconnection/bus module 226. Similarly, the processor 252 may be interconnected to the power management unit 254, the mmWave transceivers 256, memory 258, and various additional processors 260 via the interconnection/bus module 264. The interconnection/bus module 226, 250, 264 may include an array of reconfigurable logic gates and/or implement a bus architecture (e.g., CoreConnect, AMBA, etc.). Communications may be provided by advanced interconnects, such as high-performance networks-on chip (NoCs).

The first and/or second SOCs 202, 204 may further include an input/output module (not illustrated) for communicating with resources external to the SOC, such as a clock 206 and a voltage regulator 208. Resources external to the SOC (e.g., clock 206, voltage regulator 208) may be shared by two or more of the internal SOC processors/cores.

In addition to the example SIP 200 discussed above, various embodiments may be implemented in a wide variety of computing systems, which may include a single processor, multiple processors, multicore processors, or any combination thereof.

Figure 3:
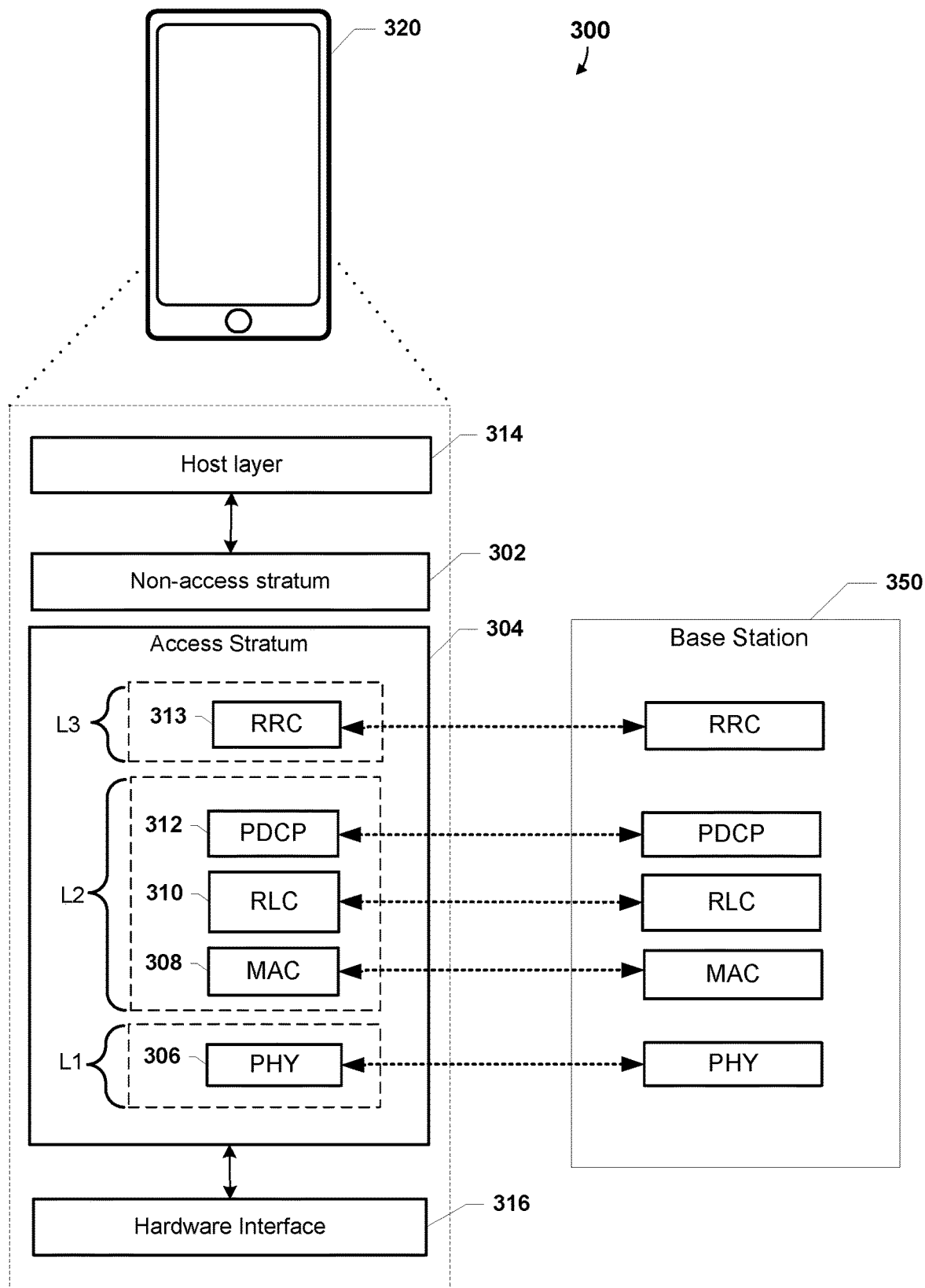
FIG. 3 is a diagram illustrating an example of a software architecture including a radio protocol stack for the user and control planes in wireless communications in accordance with various embodiments.

FIG. 3 illustrates an example of a software architecture 300 including a radio protocol stack for the user and control planes in wireless communications between a base station 350 (e.g., the base station 104) and a wireless device 320 (e.g., the wireless device 102, 200). With reference to FIGS. 1-3, the wireless device 320 may implement the software architecture 300 to communicate with the base station 350 of a communication system (e.g., 100). In various embodiments, layers in software architecture 300 may form logical connections with corresponding layers in software of the base station 350. The software architecture 300 may be distributed among one or more processors (e.g., the processors 212, 214, 216, 218, 252, 260). While illustrated with respect to one radio protocol stack, in a multi-SIM (subscriber identity module) wireless device, the software architecture 300 may include multiple protocol stacks, each of which may be associated with a different SIM (e.g., two protocol stacks associated with two SIMs, respectively, in a dual-SIM wireless communication device). While described below with reference to LTE communication layers, the software architecture 300 may support any of variety of standards and protocols for wireless communications, and/or may include additional protocol stacks that support any of variety of standards and protocols wireless communications.

The software architecture 300 may include a Non-Access Stratum (NAS) 302 and an Access Stratum (AS) 304. The NAS 302 may include functions and protocols to support packet filtering, security management, mobility control, session management, and traffic and signaling between a SIM(s) of the wireless device (e.g., SIM(s) 204) and its core network. The AS 304 may include functions and protocols that support communication between a SIM(s) (e.g., SIM(s) 204) and entities of supported access networks (e.g., a base station). In particular, the AS 304 may include at least three layers (Layer 1, Layer 2, and Layer 3), each of which may contain various sub-layers.

In the user and control planes, Layer 1 (L1) of the AS 304 may be a physical layer (PHY) 306, which may oversee functions that enable transmission and/or reception over the air interface. Examples of such physical layer 306 functions may include cyclic redundancy check (CRC) attachment, coding blocks, scrambling and descrambling, modulation and demodulation, signal measurements, MIMO, etc. The physical layer may include various logical channels, including the PDCCH and the PDSCH.

In the user and control planes, Layer 2 (L2) of the AS 304 may be responsible for the link between the wireless device 320 and the base station 350 over the physical layer 306. In the various embodiments, Layer 2 may include a media access control (MAC) sublayer 308, a radio link control (RLC) sublayer 310, and a packet data convergence protocol (PDCP) 312 sublayer, each of which form logical connections terminating at the base station 350.

In the control plane, Layer 3 (L3) of the AS 304 may include a radio resource control (RRC) sublayer 3. While not shown, the software architecture 300 may include additional Layer 3 sublayers, as well as various upper layers above Layer 3. In various embodiments, the RRC sublayer 313 may provide functions INCLUDING broadcasting system information, paging, and establishing and releasing an RRC signaling connection between the wireless device 320 and the base station 350.

In various embodiments, the PDCP sublayer 312 may provide uplink functions including multiplexing between different radio bearers and logical channels, sequence number addition, handover data handling, integrity protection, ciphering, and header compression. In the downlink, the PDCP sublayer 312 may provide functions that include in-sequence delivery of data packets, duplicate data packet detection, integrity validation, deciphering, and header decompression.

In the uplink, the RLC sublayer 310 may provide segmentation and concatenation of upper layer data packets, retransmission of lost data packets, and Automatic Repeat Request (ARQ). In the downlink, while the RLC sublayer 310 functions may include reordering of data packets to compensate for out-of-order reception, reassembly of upper layer data packets, and ARQ.

In the uplink, MAC sublayer 308 may provide functions including multiplexing between logical and transport channels, random access procedure, logical channel priority, and hybrid-ARQ (HARQ) operations. In the downlink, the MAC layer functions may include channel mapping within a cell, de-multiplexing, discontinuous reception (DRX), and HARQ operations.

While the software architecture 300 may provide functions to transmit data through physical media, the software architecture 300 may further include at least one host layer 314 to provide data transfer services to various applications in the wireless device 320. In some embodiments, application-specific functions provided by the at least one host layer 314 may provide an interface between the software architecture and the general purpose processor 206.

In other embodiments, the software architecture 300 may include one or more higher logical layer (e.g., transport, session, presentation, application, etc.) that provide host layer functions. For example, in some embodiments, the software architecture 300 may include a network layer (e.g., IP layer) in which a logical connection terminates at a packet data network (PDN) gateway (PGW). In some embodiments, the software architecture 300 may include an application layer in which a logical connection terminates at another device (e.g., end user device, server, etc.). In some embodiments, the software architecture 300 may further include in the AS 304 a hardware interface 316 between the physical layer 306 and the communication hardware (e.g., one or more radio frequency (RF) transceivers).

Re-transmissions of missing or erroneously received data units in an LTE wireless network are handled primarily by the HARQ mechanism in the MAC layer, complemented by the ARQ retransmission functionality of the RLC layer in LTE. This two-level retransmission structure is a result of the trade-off between fast and reliable feedback of the status reports. In particular, the HARQ mechanism provides very fast retransmission which may be suitable for high speeds used in LTE, whereas the ARQ is responsible for reliability. Usually HARQ handles the majority of transmission errors but sometimes the mechanism fails, in which case ARQ may be needed.

Specifically, HARQ feedback is fast and frequent to correct transmission errors as soon as possible. In this manner, the end-to-end round trip time (RTT) for HARQ is low. The HARQ processes may involve a synchronous one-bit ACK/NACK signal that is sent every transmission attempt, the timing of which is used by the network to identify the corresponding data transmission. However, since the binary feedback at the HARQ level is susceptible to transmission errors, the additional ARQ protocol provides a reliable (but slower) feedback. Typically, ARQ processes involve asynchronous RLC status reports that contain explicit sequence numbers, which are protected by a cyclic redundancy check (CRC). Compared to HARQ, RLC status reports in ARQ processes are transmitted relatively infrequently and thus the cost of obtaining reliability is relatively small.

Figure 4:
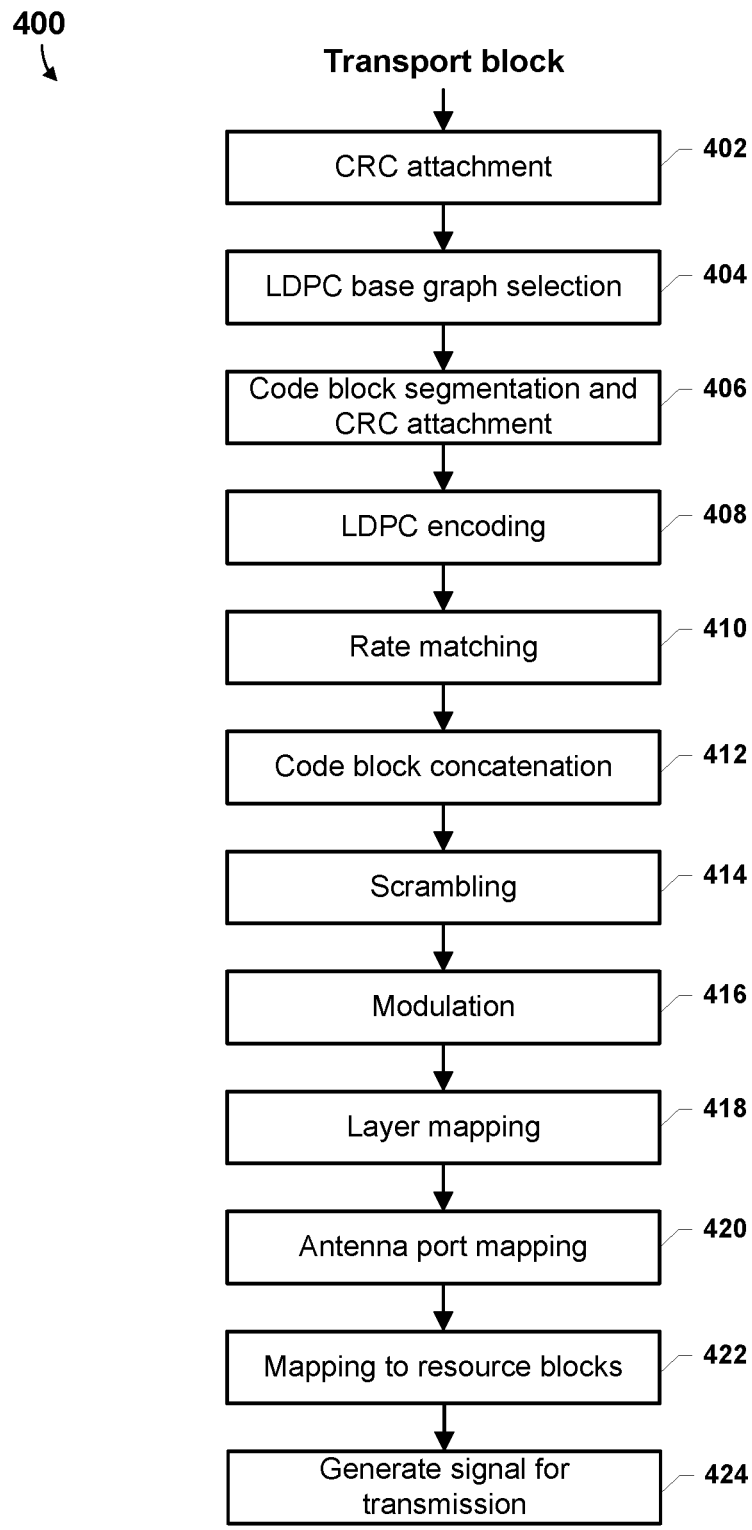
FIG. 4 is an illustration of operations that may be performed for physical layer processing of downlink channels in accordance with various embodiments.

FIG. 4 illustrates operations 400 that may be performed for physical layer processing of the PDCCH and PDSCH. With reference to FIGS. 1-4, the operations 400 may be performed by a processor of a base station (e.g., the base station 104, 350) and/or a wireless device (e.g., the wireless device 102, 200, 320). Although operations 400 are described for PDSCH processing, PDCCH processing generally involves the same operations with minor modifications, such as described in the 3GPP TS 38.211, 38.212, 38.213 and 38.214 technical specifications (TS).

The PDCCH may carry resource assignments for a wireless device which may be included in, for example, a Downlink Control Information (DCI) message. In some embodiments, multiple PDCCHs may be transmitted in the same subframe using Control Channel Elements (CCE) each of which may include a set of Resource Element Groups (REG). In some embodiments 1, 2, 4, 8, or 16 CCEs may be used for a wireless device to accommodate different DCI payload sizes or coding rates, and depending on channel conditions to ensure sufficient robustness. In 5G NR, the PDCCH may be sent in a single ControlResourceSet (CORESET), and may be transmitted with an associated DMRS. This enables, among other things, wireless device-specific beamforming for control channel.

The PDSCH may carry data signaling to a wireless device, as well as wireless device-specific upper layer information (e.g., layer-2 and above), system information, and paging information. The PDSCH may carry data in Transport Blocks (TB), which may correspond to a MAC PDU.

In operation 402, a processor (e.g., of the base station) may receive a transport block of information to be transmitted, and may perform a cyclic redundancy check (CRC) for error detection.

In operation 404, the processor may select a low-density parity check (LDPC) base graph for error correction.

In operation 406, the processor may segment the transport block into code blocks, and may append a CRC attachment to enable error detection.

In operation 408, the processor may encode each of the code blocks using an LDPC encoder In operation 410, the processor rate matching to dynamically adjust the LDPC encoding to allocated resources (i.e., physical transport resources).

In operation 412, the processor may perform code block concatenation to form codewords for transmission over the downlink channel.

In operation 414, the processor may perform scrambling of the information to be transmitted.

In operation 416, the processor may modulate the scrambled information to generate data symbols. In various embodiments, the processor may employ a modulation and coding scheme for modulation, such as Quadrature Phase Shift Keying (QPSK) or a form of quadrature amplitude modulation (e.g., 16QAM, 64QAM, or 256QAM).

In operation 418, the processor may perform layer mapping to map the modulated symbols to layers for transport.

In operation 420, the processor may perform antenna port mapping to map layers with one or more antenna ports allocated for downlink transmission.

In operation 422, the processor may map the modulated data symbols to RBs (Resource Blocks) in a resource grid as per subcarrier spacing. In some embodiments, the processor may insert DMRS values during resource element mapping used for channel estimation and equalization at the wireless device receiver.

In operation 424, the processor may generate a signal for transmission (e.g., an OFDM signal).

In various embodiments, upon reception of transmitted signal, a receiving device may perform one or more of the operations 400 in reverse to decode a transport block (e.g., at the PHY layer) before passing the decoded information to upper layers of the protocol stack.

Figure 5:
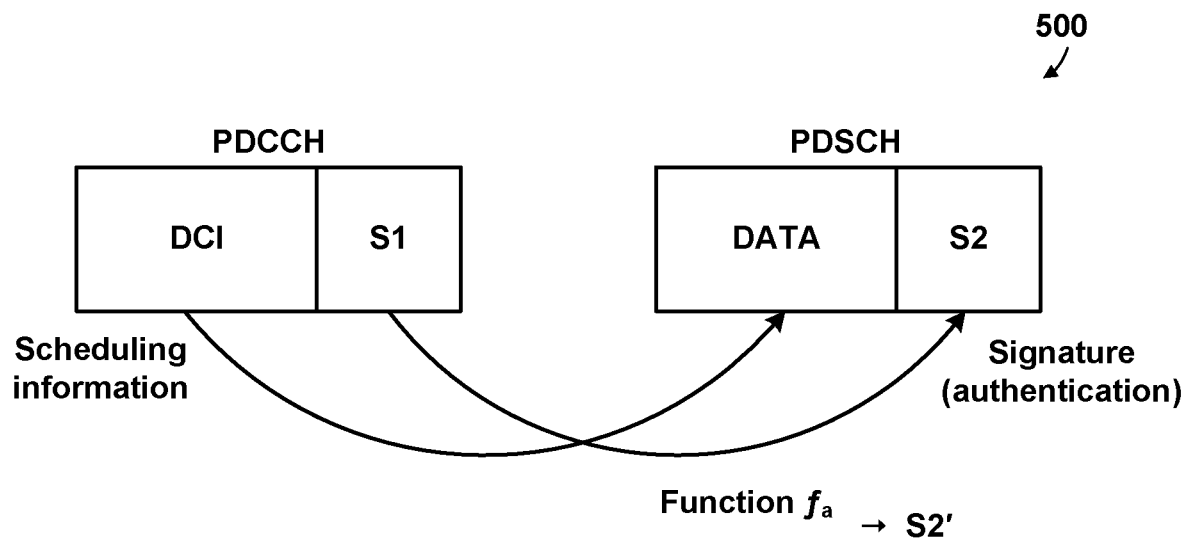
FIGS. 5-9 illustrate operations of methods of managing physical layer security in accordance with various embodiments.

FIG. 5 illustrates operations 500 of a method of managing physical layer security in a wireless device according to various embodiments. With reference to FIGS. 1-5, in various embodiments, a receiving wireless device (e.g., the wireless device 102, 200, 320) may perform a security check when receiving information via downlink channels (e.g., the PDCCH and the PDSCH).

For example, the wireless device may receive downlink control signaling, e.g., downlink control information (DCI), via the PDCCH. The wireless device may determine that the downlink control signaling includes a first signature (S1). For example, the first signature may be appended to the downlink control information. In some embodiments, the first signature may be appended to the control payload before or after a cyclic redundancy check (CRC), or before or after channel coding. In some embodiments, the downlink control signaling may include scheduling information that enables the wireless device to receive data signaling, for example, via the PDSCH.

In some embodiments, the wireless device may receive downlink data signaling, e.g., downlink data (DATA), via the PDSCH. In some embodiments, the wireless device may determine that the downlink data signaling has been modified (e.g., by the base station) using a second signature (S2).

For example, the second signature may be appended to or included with the downlink data signaling.

In some embodiments, the wireless device may apply a function to the first signature to determine a second signature (S2'). In some embodiments, the function may include an authentication function ($f_a$). In some embodiments, the wireless device may provide inputs to the function including at least a key shared between the wireless device and base station (e.g., the access security key) and the first signature (S1). In some embodiments, the function may be or may include a one-way function, a key derivation function, a secure hash function, or another suitable function. In some embodiments, the function may include a process, algorithm, mathematical transform, or another operation or series of operations, which may be provisioned in the wireless device by a network operator. In some embodiments, the network operator may statically provision the wireless device with the function. In some embodiments, the network operator may provision the wireless device with the function dynamically. For example, the network operator may change or provide a new function to the wireless device from time to time.

In some embodiments, the wireless device may perform matching operation to determine whether the second signature received from the base station (i.e., S2) matches the second signature determined by the wireless device (i.e., S2'). In some embodiments, in response to determining that the second signature received from the base station matches the second signature determined by the wireless device, the wireless device may determine that one or more of the downlink data signaling and/or the downlink control signaling is authenticated (i.e., that the message or signal is authenticated). In some embodiments, in response to determining that the second signature received from the base station matches the second signature determined by the wireless device, the wireless device may enable communication with the base station.

Figure 6:
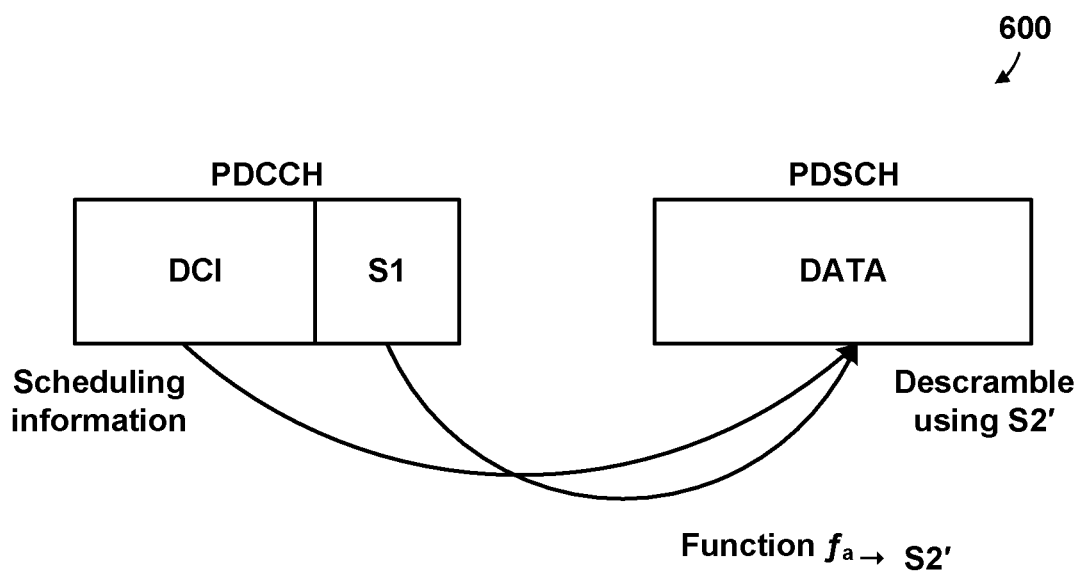

FIG. 6 illustrates operations 600 of a method of managing physical layer security according to various embodiments. With reference to FIGS. 1-6, in various embodiments, a receiving wireless device (e.g., the wireless device 102, 200, 320) may perform a security check when receiving information via downlink channels (e.g., the PDCCH and the PDSCH).

For example, the wireless device may receive downlink control signaling, e.g., downlink control information (DCI), via the PDCCH. The wireless device may determine that the downlink control signaling includes a first signature (S1).

In some embodiments, the wireless device may receive downlink data signaling, e.g., downlink data (DATA), via the PDSCH. In some embodiments, the wireless device may determine that the downlink data signaling has been modified (e.g., by the base station) using a second signature (S2). For example, the downlink data may be scrambled using the second signature.

In some embodiments, the wireless device may apply the function ($f_a$) to the first signature to determine a second signature (S2'). In some embodiments, the wireless device may perform matching operation to determine whether the second signature received from the base station (i.e., S2) matches the second signature determined by the wireless device (i.e., S2'). For example, the wireless device may attempt to descramble the data received from the base station using the second signature determined by the wireless device. In some embodiments, in response to determining that the second signature received from the base station matches the second signature determined by the wireless device—e.g., if the wireless device can successfully descramble the data—the wireless device may determine that one or more of the downlink data signaling and/or the downlink control signaling is authenticated.

Figure 7:
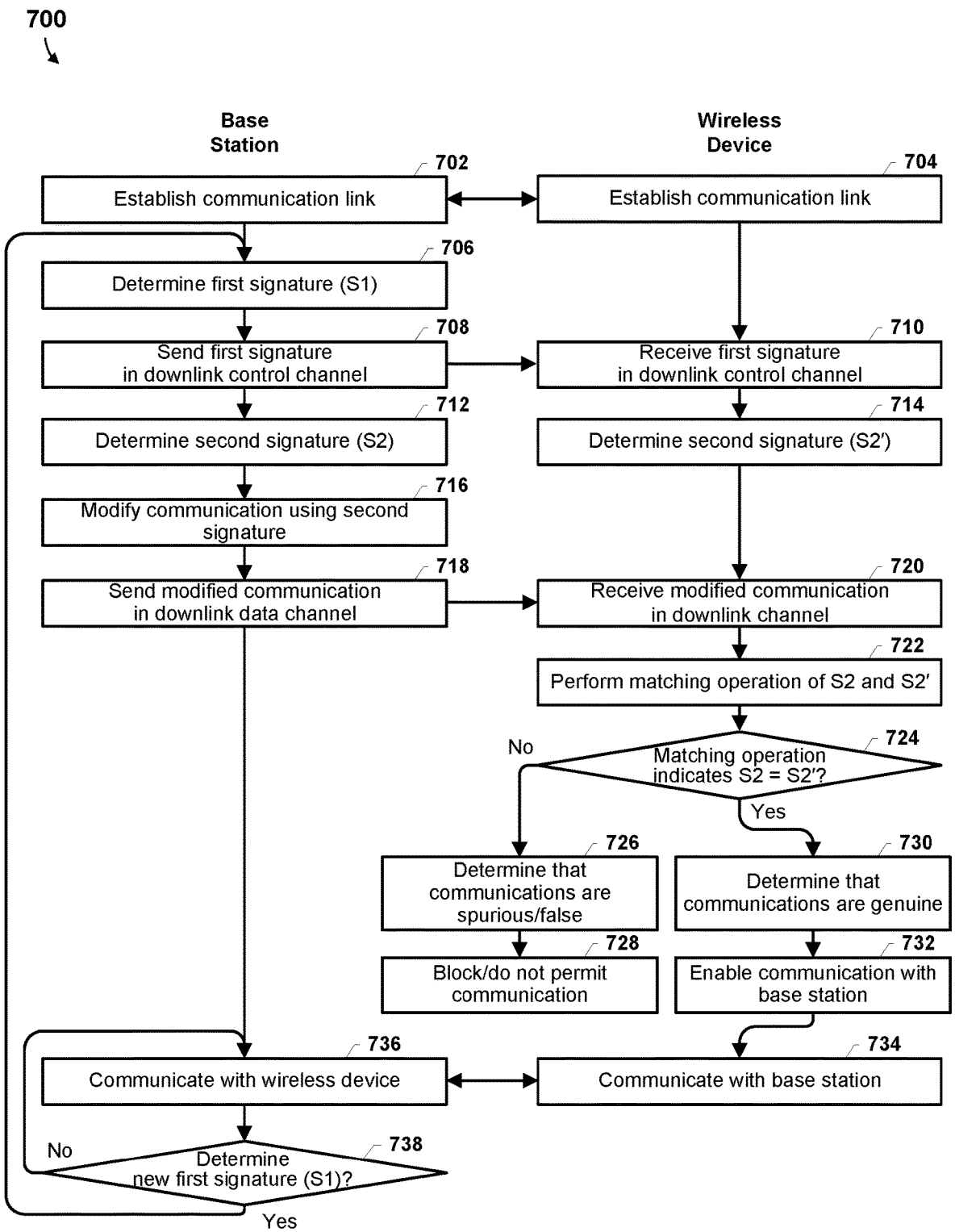

FIG. 7 illustrates a method 700 of managing physical layer security between a base station and a wireless device according to some embodiments. With reference to FIGS. 1-7, operations of the method 700 may be performed by a processor in a base station (e.g., the base station 104, 350) and by a processor in a wireless device (e.g., the wireless device 102, 200, 320).

In block 702, the processor of the base station may establish a communication link or a similar suitable communication link with the wireless device.

In block 704, the processor of the wireless device may establish a communication link or a similar suitable communication link with the base station.

In various embodiments, the processors of the base station and the wireless device may negotiate a communication link, and each of the base station and the wireless device may enter into an active communication mode such as an RRC_Connected mode or a similar state or operational mode.

In block 706, the processor of the base station may determine a first signature (S1). In some embodiments, the first signature may include a specific sequence of bits. In some embodiments, the first signature may include a randomly determine sequence of bits. In some embodiments, the first sequence of bits may include an Access Security Management Entity (ASME) key. In some embodiments, the first signature may include a specific waveform. In some embodiments, the first signature may include a PDCCH demodulation reference signal (DMRS) sequence. In some embodiments, the first signature may include any combination of the foregoing.

In block 708, the processor of the base station may send the first signature to the wireless device in a downlink control channel (e.g., the PDCCH). In some embodiments, the base station processor may append the first signature to a control signal. In some embodiments, the base station processor may append the to the control payload before or after a cyclic redundancy check (CRC) (e.g., block 406, FIG. 4). In some embodiments, the base station processor may transmit the specific waveform, for example as a preamble, in or along with control signaling via the PDCCH. In some embodiments, the base station processor may determine the DMRS sequence, e.g., an initialization seed, as a function of parameters such as a cell identifier (cell ID), a system frame number, and/or other functional or operational parameters of the base station. In some embodiments, the base station processor may determine the PDCCH DMRS from a function with inputs such as a cell ID, an initialization seed, a system frame number, etc. In some embodiments, base station processor may determine the initialization seed as a function of the first signature. In some embodiments, the first signature may include any combination of the foregoing.

In block 710, the processor of the wireless device may receive the first signature in the downlink control channel. The processor may receive the first signature in the downlink control channel via a wireless transceiver 256 coupled to the processor (e.g., modem processor 212 or 252).

In block 712, the processor of the base station may determine a second signature based on the first signature. In some embodiments, the base station processor may apply a function ($f_a$) to the first signature to determine the second signature. In some embodiments, the second signature may be represented as $S2=f_a(S1)$, in which the second signature is determined by applying the function to the first signature.

In block 714, the processor of the wireless device may determine (i.e., independently of the base station) a second signature (S2') based on the first signature. In some embodiments, the base station processor may apply the function ($f_a$) to the first signature to determine the second signature. In some embodiments, the network operator may statically provision the wireless device with the function. In some embodiments, the network operator may provision the wireless device with the function dynamically. For example, the network operator may change or provide a new function to the wireless device from time to time. In some embodiments, the wireless device processor may determine the second signature as a function of the first signature, which may be represented as $S2'=f_a(S1)$.

In block 716, the processor of the base station may modify a communication using the second signature. In some embodiments, the base station processor may modify a data signal using the second signature. In some embodiments, the base station processor may append the second signal to a portion of the data signal. In some embodiments, the base station may scramble one or more portions of the data signal using the second signature (e.g., block 414, FIG. 2).

In block 718, the processor of the base station may send the modified communication to the wireless device in a downlink data channel (e.g., via the PDSCH).

In block 720, the processor of the wireless device may receive the modified communication in the downlink data channel. The processor may receive the modified communication in the downlink control channel via a wireless transceiver 256 coupled to the processor (e.g., modem processor 212 or 252).

In block 722, the processor of the wireless device may perform a matching operation to determine whether the second signature determined by the wireless device (i.e., S2') matches the second signature used by the base station to modify the communication (i.e., S2). In some embodiments, the wireless device processor may identify the second signature in the modified communication sent by the base station, and the wireless device may perform the matching operation on the received second signature and the second signature determined by the wireless device. In some embodiments, the wireless device may use its determined second signature to descramble one or more portions of the data signal. In some embodiments, the wireless device processor may use memory (e.g., 220, 258) coupled to the processor in performing the matching operations.

In determination block 724, the processor of the wireless device may determine whether the second signature determined by the wireless device (i.e., S2') matches the second signature used by the base station to modify the communication (i.e., S2). For example, the matching operation performed in block 722 may involve subtracting the second signature determined by the wireless device (i.e., S2') from the second signature used by the base station to modify the communication (i.e., S2), and determination block 724 may involve determining whether there is a remainder following the subtraction.

In response to determining that the second signature determined by the processor does not match the second signature used to modify the communication (i.e., determination block 724="No"), the wireless device processor may determine that the received communications (i.e., in the downlink control channel and/or the downlink data channel) are spurious or false communications in block 726.

In block 728, the wireless device processor may block or may not permit communication with the device from which the communications are determined to be spurious.

In response to determining that the second signature determined by the processor matches the second signature used to modify the communication (i.e., determination block 724="Yes"), the wireless device processor may determine that the received communications (i.e., in the downlink control channel and/or the downlink data channel) are genuine in block 730. In some embodiments, the wireless device processor may determine that one or more of the downlink control signal and the downlink data signal are authenticated.

In block 732, the wireless device processor may enable communication with the base station.

In block 734, the processor of the wireless device may communicate with the base station. For example, the processor (e.g., modem processor 212 or 252) may send and receive wireless communications via a wireless transceiver (e.g., 256) coupled to the processor.

In block 736, the processor of the base station may communicate with the wireless device.

In determination block 738, the processor of the base station may determine whether to generate a new first signature.

In response to determining not to determine (or generate) anew first signature (i.e., determination block 738="No"), the base station processor may continue to communicate with the wireless device in block 736.

In response to determining to determine (or generate) anew first signature (i.e., determination block 738="No"), the base station processor may determine a new first signature in block 706.

Figure 8:
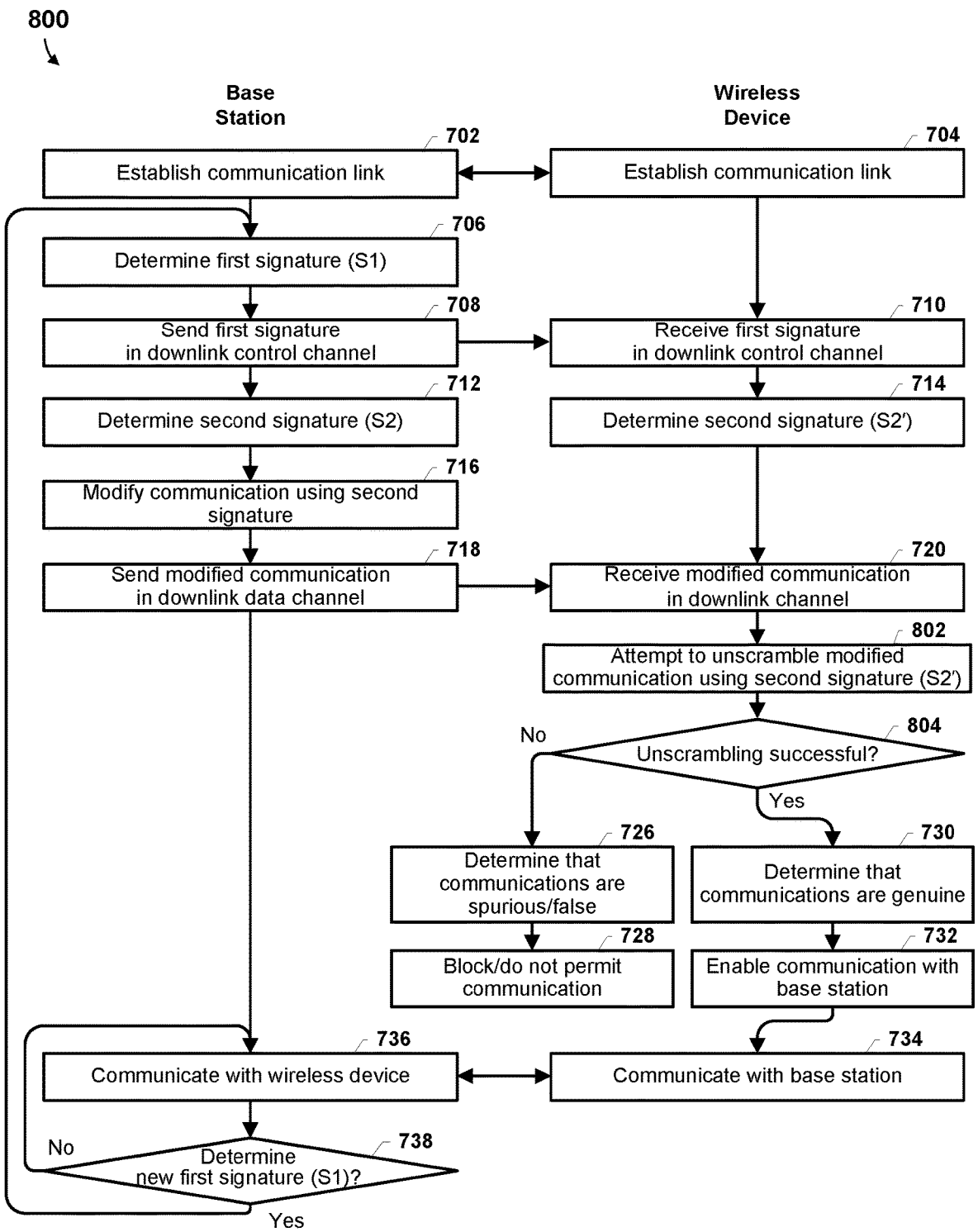

FIG. 8 illustrates a method 800 of managing physical layer security according to some embodiments. With reference to FIGS. 1-8, operations of the method 800 may be performed by a processor in a base station (e.g., the base station 104, 350) and by a processor in a wireless device (e.g., the wireless device 102, 200, 320). In blocks 702-738, the processors of the base station and the wireless device may perform operations of like-numbered blocks of the method 700 as described.

In block 802, the processor of the wireless device may attempt to unscramble the modified communication using the second signature determined by the wireless device processor (i.e., S2').

In determination block 804, the processor of the wireless device may determine whether the attempted unscrambling of the modified communication was successful.

In response to determining that the attempted unscrambling of the modified communication was not successful (i.e., determination block 804="No"), the wireless device processor may determine that the received communications (i.e., in the downlink control channel and/or the downlink data channel) are spurious or false communications in block 726.

In response to determining that the attempted unscrambling of the modified communication was successful (i.e., determination block 804="Yes"), the wireless device processor may determine that the received communications (i.e., in the downlink control channel and/or the downlink data channel) are genuine in block 730.

Figure 9:
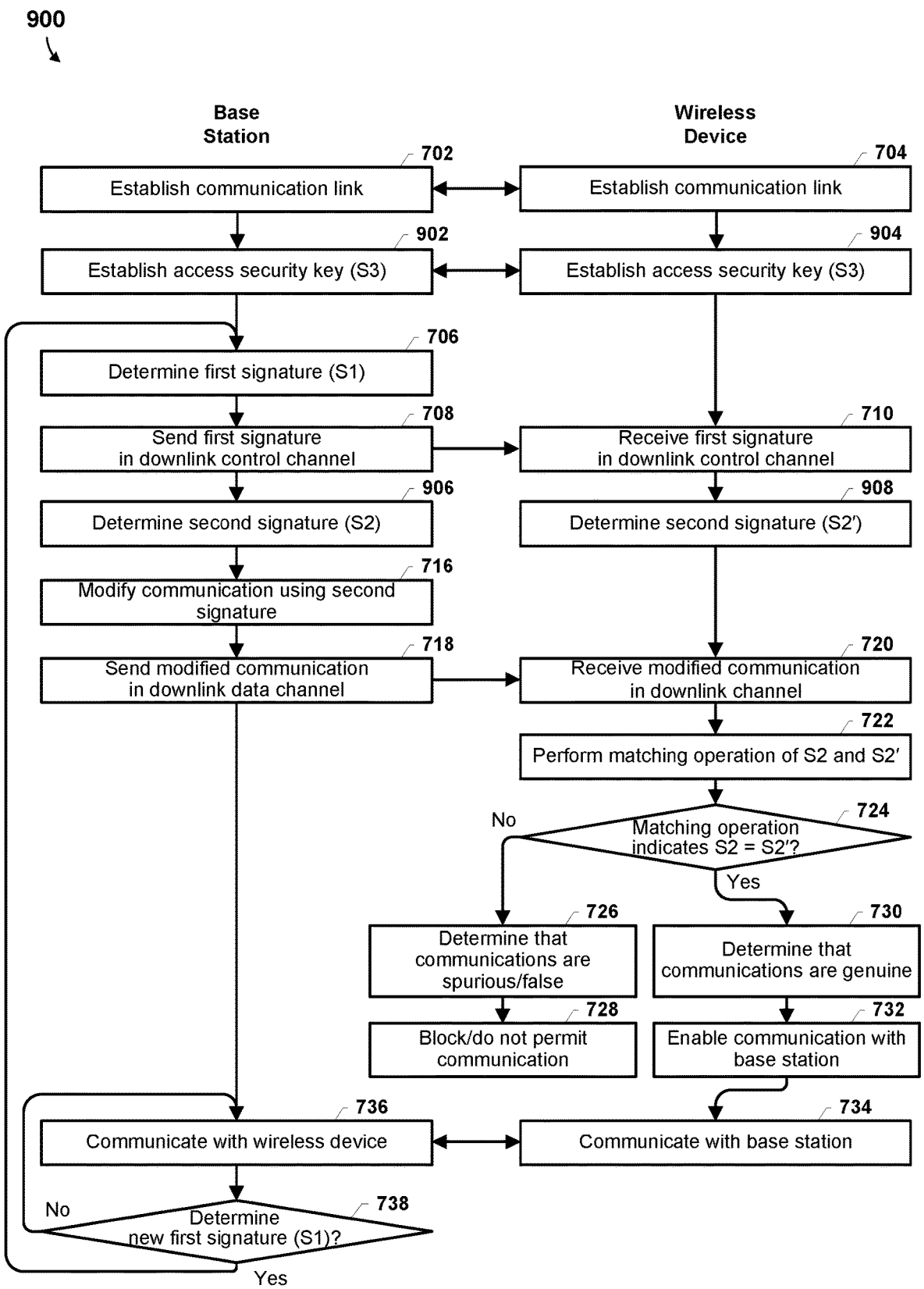

FIG. 9 illustrates a method 900 of managing physical layer security according to some embodiments. With reference to FIGS. 1-9, operations of the method 900 may be performed by a processor in a base station (e.g., the base station 104, 350) and by a processor in a wireless device (e.g., the wireless device 102, 200, 320). In blocks 702-738, the processors of the base station and the wireless device may perform operations of like-numbered blocks of the method 700 as described.

In blocks 902 and 904, the processors of the base station and the wireless device may establish an access security key between the base station and the wireless device. For example, during the establishment of the communication link between the base station and the wireless device (i.e., blocks 702 and 704), the processors of the base station and the wireless device may determine the access security key. In some embodiments, the access security key may be obtained or derived based on a key shared between the wireless device and the base station during a security establishment process, such as during an AS (access stratum) security mode command procedure. In some embodiments, the access security key may include an ASME key. In some embodiments, the access security key may be a key determined by the processors of the base station and the wireless device for another purpose, such as for use with MAC signaling, or for use with other signaling, or for another function. In some embodiments, the processors of the base station and the wireless device may use the access security key as a third signature (S3).

In block 906, the processor of the base station may determine a second signature (S2) as a function of the first signature (S1) and the third signature (S3). In some embodiments, the base station processor may apply a function ($f_a$) to determine the second signature. In some embodiments, the second signature may be determined as $S2=f_a(S1, S3)$, in which the second signature is determined as a function of the function, the first signature, and the third signature.

In block 908, the processor of the wireless device may determine (i.e., independently of the base station) a second signature (S2') based on the first signature and the third signature. In some embodiments, the base station processor may apply the function ($f_a$) to the first signature and the third signature to determine the second signature. In some embodiments, the wireless device processor may determine the second signature as a function of the function, the first signature, and the third signature, which may be represented as $S2'=f_a(S1,S3)$.

Figure 10:
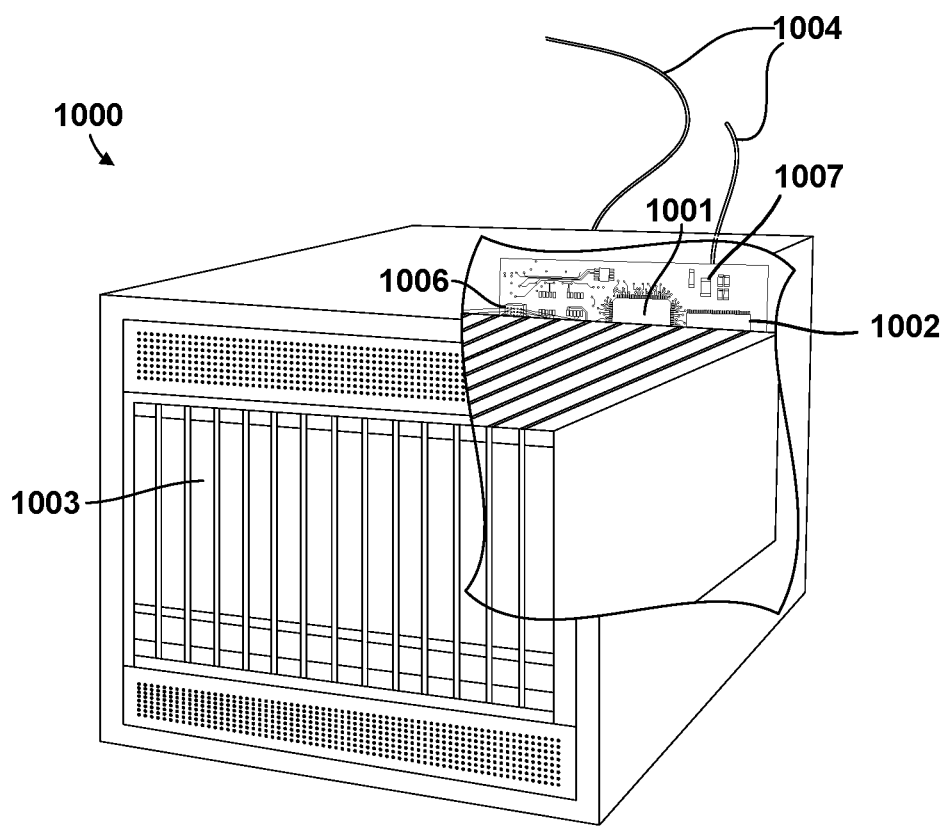
FIG. 10 is a component block diagram of a wireless router device suitable for implementing management of cell selection in accordance with various embodiments.

Various embodiments may be implemented on a variety of wireless network devices, an example of which is illustrated in FIG. 10 in the form of a wireless network computing device 1000 functioning as a network element of a communication network, such as a base station. Such network computing devices may include at least the components illustrated in FIG. 10. With reference to FIGS. 1-10, the network computing device 1000 may typically include a processor 1001 coupled to volatile memory 1002 and a large capacity nonvolatile memory, such as a disk drive 1003. The network computing device 1000 may also include a peripheral memory access device such as a floppy disc drive, compact disc (CD) or digital video disc (DVD) drive 1006 coupled to the processor 1001. The network computing device 1000 may also include network access ports 1004 (or interfaces) coupled to the processor 1001 for establishing data connections with a network, such as the Internet and/or a local area network coupled to other system computers and servers. The network computing device 1000 may include one or more antennas 1007 for sending and receiving electromagnetic radiation that may be connected to a wireless communication link. The network computing device 1000 may include additional access ports, such as USB, Firewire, Thunderbolt, and the like for coupling to peripherals, external memory, or other devices.

Figure 11:
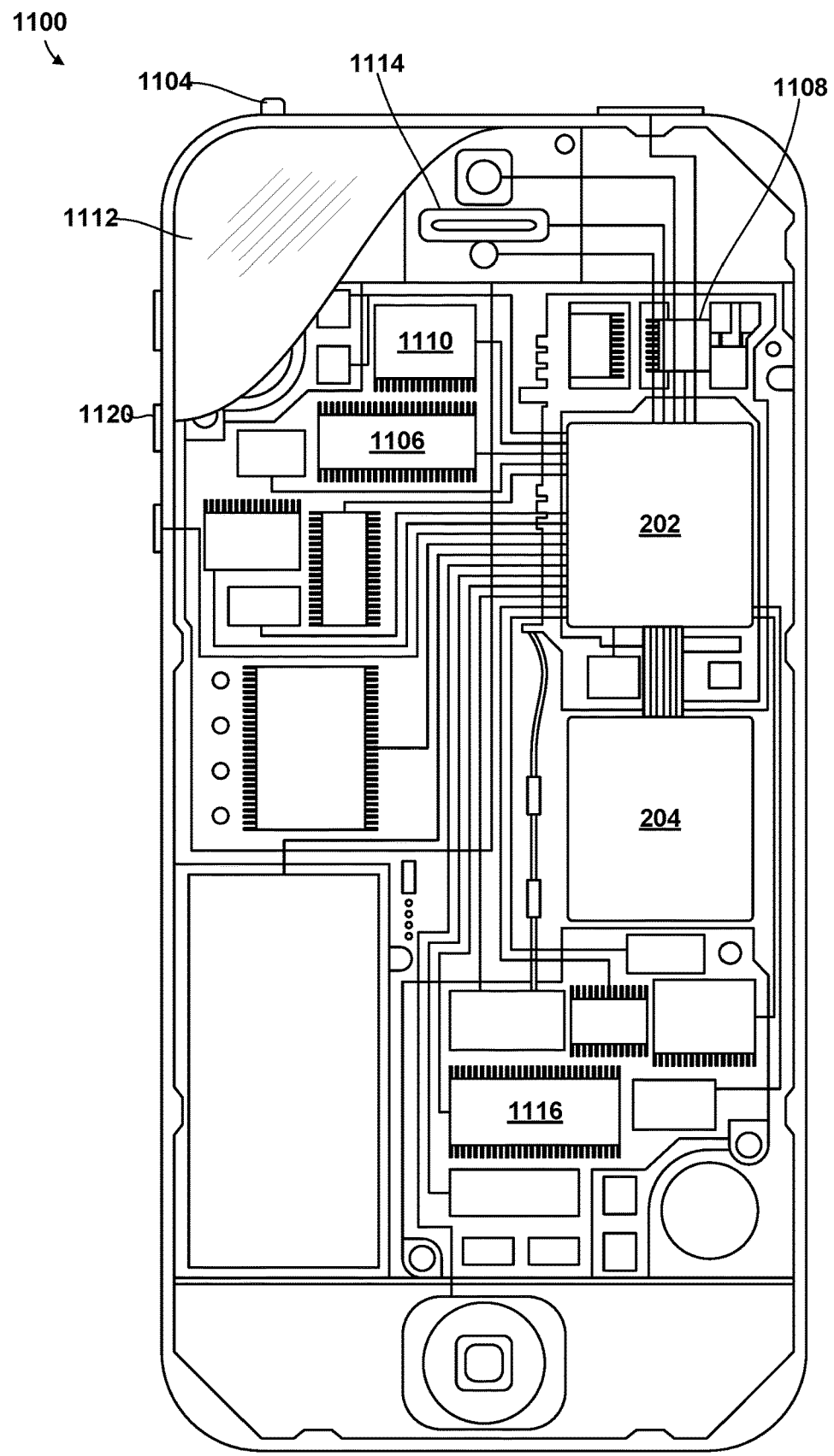
FIG. 11 is a component block diagram of a wireless communication device suitable for implementing management of cell selection in accordance with various embodiments.

Various embodiments may be implemented on a variety of wireless devices (e.g., the wireless device 102, 200, 320), an example of which is illustrated in FIG. 11 in the form of a smartphone 1100. The smartphone 1100 may include a first SOC 202 (e.g., a SOC-CPU) coupled to a second SOC 204 (e.g., a 5G capable SOC). The first and second SOCs 202, 204 may be coupled to internal memory 1106, 1116, a display 1112, and to a speaker 1114. Additionally, the smartphone 1100 may include an antenna 1104 for sending and receiving electromagnetic radiation that may be connected to a wireless data link and/or cellular telephone transceiver 1108 coupled to one or more processors in the first and/or second SOCs 202, 204. Smartphones 1100 typically also include menu selection buttons or rocker switches 1120 for receiving user inputs.

A typical smartphone 1100 also includes a sound encoding/decoding (CODEC) circuit 1110, which digitizes sound received from a microphone into data packets suitable for wireless transmission and decodes received sound data packets to generate analog signals that are provided to the speaker to generate sound. Also, one or more of the processors in the first and second SOCs 202, 204, wireless transceiver 1108 and CODEC 1110 may include a digital signal processor (DSP) circuit (not shown separately).

The processors of the wireless network computing device 1000 and the smart phone 1100 may be any programmable microprocessor, microcomputer or multiple processor chip or chips that can be configured by software instructions (applications) to perform a variety of functions, including the functions of the various embodiments described below. In some mobile devices, multiple processors may be provided, such as one processor within an SOC 204 dedicated to wireless communication functions and one processor within an SOC 202 dedicated to running other applications. Typically, software applications may be stored in the memory 1106, 1116 before they are accessed and loaded into the processor. The processors may include internal memory sufficient to store the application software instructions.

As used in this application, the terms "component," "module," "system," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a wireless device and the wireless device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

A number of different cellular and mobile communication services and standards are available or contemplated in the future, all of which may implement and benefit from the various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Various embodiments provide improved methods, systems, and devices for securing communications in a communication system, and in particular communications between a base station and a wireless device. Various embodiments provide improved methods, systems, and devices for protecting physical layer signaling in a communication system, such as the signals provided in the PDCCH and PDSCH. Further, various embodiments provide improved methods and systems that enable wireless devices to determine whether signals received via downlink channels are true transmissions (i.e., from a legitimate base station) or are fabricated transmissions (i.e., from a malicious actor).

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 500-900 may be substituted for or combined with one or more operations of the methods 500-900.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of managing physical layer security in a wireless device, comprising:
   receiving, by a processor of the wireless device, downlink control signaling that includes a first signature from a base station across a physical downlink control channel (PDCCH), wherein the PDCCH is a downlink control channel that carries downlink control signaling;
   determining, by the processor, a second signature based on the first signature received from the base station;
   receiving, by the processor, a communication from the base station across a physical downlink shared channel (PDSCH), wherein the PDSCH is a downlink data channel that carries downlink data signaling and the communication, and wherein the communication was modified using the second signature from the base station;
   performing, by the processor, a matching operation to determine whether the second signature determined by the processor matches the second signature used to modify the communication; and
   enabling, by the processor, communication with the base station in response to determining that the second signature determined by the processor matches the second signature used to modify the communication.

2. The method of claim 1, wherein the communication that was modified using the second signature comprises a data communication and the second signature.

3. The method of claim 1, wherein the communication that was modified using the second signature comprises a data communication that has been scrambled using the second signature.

4. The method of claim 1, wherein performing the matching operation to determine whether the second signature determined by the processor matches the second signature used to modify the communication comprises:
   determining, by the processor, whether the second signature determined by the processor matches a second signature received in the communication.

5. The method of claim 1, wherein performing the matching operation to determine whether the second signature determined by the processor matches the second signature used to modify the communication comprises:
   determining, by the processor, whether the communication can be unscrambled using the second signature determined by the processor.

6. The method of claim 1, wherein determining the second signature based on the first signature received from the base station comprises:
   determining, by the processor, the second signature based on a function applied to the first signature.

7. The method of claim 1, wherein determining the second signature based on the first signature received from the base station comprises:
   determining, by the processor, the second signature based on the first signature and a third signature.

8. The method of claim 7, further comprising determining the third signature by determining an access security key.

9. The method of claim 8, wherein determining the access security key comprises the processor obtaining or deriving the access security key based on a key shared between the wireless device and the base station during a security establishment procedure.

10. A wireless device, comprising:
    a memory;
    a wireless transceiver; and
    a processor coupled to the memory and the wireless transceiver and configured with processor-executable instructions to perform operations comprising:
      receiving downlink control signaling that includes a first signature from a base station across a physical downlink control channel (PDCCH), wherein the PDCCH is a downlink control channel that carries downlink control signaling;
      determining a second signature based on the first signature received from the base station;
      receiving a communication from the base station across a physical downlink shared channel (PDSCH), wherein the PDSCH is a downlink data channel that carries downlink data signaling and the communication, and wherein the communication was modified using the second signature from the base station;
      performing a matching operation to determine whether the second signature determined by the processor matches the second signature used to modify the communication; and
      enabling communication with the base station in response to determining that the second signature determined by the processor matches the second signature used to modify the communication.

11. The wireless device of claim 10, wherein the communication that was modified using the second signature comprises a data communication and the second signature.

12. The wireless device of claim 10, wherein the communication that was modified using the second signature comprises a data communication that has been scrambled using the second signature.

13. The wireless device of claim 10, wherein the processor is further configured with processor-executable instructions to perform operations such that performing the matching operation to determine whether the second signature determined by the processor matches the second signature used to modify the communication comprises:
    determining whether the second signature determined by the processor matches a second signature received in the communication.

14. The wireless device of claim 10, wherein the processor is further configured with processor-executable instructions to perform operations such that performing the matching operation to determine whether the second signature determined by the processor matches the second signature used to modify the communication comprises:
    determining whether the communication can be unscrambled using the second signature determined by the processor.

15. The wireless device of claim 10, wherein the processor is further configured with processor-executable instructions to perform operations such that determining the second signature based on the first signature received from the base station comprises:
    determining the second signature based on a function applied to the first signature.

16. The wireless device of claim 10, wherein the processor is further configured with processor-executable instructions to perform operations such that determining the second signature based on the first signature received from the base station comprises:
    determining the second signature based on the first signature and a third signature.

17. The wireless device of claim 16, wherein the processor is further configured with processor-executable instructions to perform operations comprising determining the third signature using an access security key obtained or derived based on a key shared between the wireless device and the base station during a security establishment procedure.

18. A non-transitory processor-readable medium having stored thereon processor-executable instructions configured to cause a processor of a wireless device to perform operations comprising:
receiving downlink control signaling that includes a first signature from a base station across a physical downlink control channel (PDCCH), wherein the PDCCH is a downlink control channel that carries downlink control signaling;
determining a second signature based on the first signature received from the base station;
receiving a communication from the base station across a physical downlink shared channel (PDSCH), wherein the PDSCH is a downlink data channel that carries downlink data signaling and the communication, and wherein the communication was modified using the second signature from the base station;
performing a matching operation to determine whether the second signature determined by the processor matches the second signature used to modify the communication; and
enabling communication with the base station in response to determining that the second signature determined by the processor matches the second signature used to modify the communication.

19. The non-transitory processor-readable medium of claim 18, wherein the stored processor-executable instructions are configured to cause a processor of a wireless device to perform operations such that the communication that was modified using the second signature comprises a data communication and the second signature.

20. The non-transitory processor-readable medium of claim 18, wherein the communication that was modified using the second signature comprises a data communication that has been scrambled using the second signature.

21. The non-transitory processor-readable medium of claim 18, wherein the stored processor-executable instructions are configured to cause a processor of a wireless device to perform operations such that performing the matching operation to determine whether the second signature determined by the processor matches the second signature used to modify the communication comprises:
determining whether the second signature determined by the processor matches a second signature received in the communication.

22. The non-transitory processor-readable medium of claim 18, wherein the stored processor-executable instructions are configured to cause a processor of a wireless device to perform operations such that performing the matching operation to determine whether the second signature determined by the processor matches the second signature used to modify the communication comprises:
determining whether the communication can be unscrambled using the second signature determined by the processor.

23. The non-transitory processor-readable medium of claim 18, wherein the stored processor-executable instructions are configured to cause a processor of a wireless device to perform operations such that determining the second signature based on the first signature received from the base station comprises:
determining the second signature based on a function applied to the first signature.

24. The non-transitory processor-readable medium of claim 18, wherein the stored processor-executable instructions are configured to cause a processor of a wireless device to perform operations such that determining the second signature based on the first signature received from the base station comprises:
determining the second signature based on the first signature and a third signature.

25. The non-transitory processor-readable medium of claim 24, wherein the stored processor-executable instructions are configured to cause a processor of a wireless device to perform operations further comprising determining the third signature using an access security key obtained or derived based on a key shared between the wireless device and the base station during a security establishment procedure.

26. A wireless device, comprising:
a processor;
means for receiving downlink control signaling that includes a first signature from a base station across a physical downlink control channel (PDCCH), wherein the PDCCH is a downlink control channel that carries downlink control signaling;
means for determining by the processor a second signature based on the first signature received from the base station;
means for receiving a communication from the base station across a physical downlink shared channel (PDSCH), wherein the PDSCH is a downlink data channel that carries downlink data signaling and the communication, and wherein the communication was modified using the second signature from the base station;
means for performing a matching operation to determine whether the second signature determined by the processor matches the second signature used to modify the communication; and
means for enabling communication with the base station in response to determining that the second signature determined by the processor matches the second signature used to modify the communication.

27. The wireless device of claim 26, wherein the communication that was modified using the second signature comprises a data communication and the second signature.

28. The wireless device of claim 26, wherein the communication that was modified using the second signature comprises a data communication that has been scrambled using the second signature.

29. The wireless device of claim 26, wherein means for performing the matching operation to determine whether the second signature determined by the processor matches the second signature used to modify the communication comprises:
means for determining whether the second signature determined by the processor matches a second signature received in the communication.

30. The wireless device of claim 26, wherein means for performing the matching operation to determine whether the second signature determined by the processor matches the second signature used to modify the communication comprises:
means for determining whether the communication can be unscrambled using the second signature determined by the processor.

31. The wireless device of claim 26, wherein means for determining the second signature based on the first signature received from the base station comprises:

means for determining the second signature based on a function applied to the first signature.

32. The wireless device of claim 26, wherein means for determining the second signature based on the first signature received from the base station comprises:

means for determining the second signature based on the first signature and a third signature.

33. The wireless device of claim 32, further comprising means for determining the third signature by obtaining or deriving an access security key based on a key shared between the wireless device and the base station during a security establishment procedure.

* * * * *